UNITED STATES PATENT OFFICE.

OSCAR BALLY, OF MANNHEIM, GERMANY, ASSIGNOR TO BADISCHE ANILIN & SODA FABRIK, OF LUDWIGSHAFEN, GERMANY, A CORPORATION, OF GERMANY.

ANTHRACENE DYE AND PROCESS OF MAKING SAME.

SPECIFICATION forming part of Letters Patent No. 707,373, dated August 19, 1902.

Application filed July 2, 1901. Serial No. 66,897. (No specimens.)

*To all whom it may concern:*

Be it known that I, OSCAR BALLY, doctor of philosophy and chemist, a citizen of the Swiss Republic, residing at Mannheim, in the Grand Duchy of Baden, Germany, have invented new and useful Improvements in Coloring-Matter of the Anthracene Series and Process of Producing Same, of which the following is a specification.

It is known that certain derivatives of amido-anthraquinone on treatment with bromin or chlorin yield well-defined halogenized products which can be condensed with primary aromatic amins to form dyestuffs.

I have now discovered that the above-mentioned class of halogenized amido-anthraquinone substances—that is to say, halogenized amido-anthraquinones, halogenized alphylated amido-anthraquinones, and their respective sulfo-acids—can also be condensed with sulfo-acids of primary aromatic amins, forming new coloring-matters which are, as a rule, directly soluble in water and whose solubility can be increased, if desired, by further sulfonation. The preparation of these new coloring-matters can be conveniently effected by heating some one of or a mixture of any of the said halogen products with an aqueous solution of the sulfo-acid of a primary aromatic amin under pressure, and it is often advantageous to and a salt of the alkaline earths or of the alkalies, which can remove any hydrochloric acid or hydrobromic acid formed during the reaction—for example, calcium acetate.

The following examples will serve to further illustrate the nature of my invention and a manner of carrying it into practical effect; but I do not confine myself to the details therein given. The parts are by weight.

*Example 1—Condensation of halogenized amido-anthraquinone monosulfo-acid with sodium sulfanilate.*—Suspend one (1) part of crude (alpha and beta) anilido-anthraquinone sulfo-acid (obtainable according to the specification of Letters Patent No. 656,081) in twenty (20) parts of water. Add at ordinary temperature twelve (12) parts of bromin, (corresponding to three molecular proportions of bromin,) and stir for twelve (12) hours. Isolate by the addition of common salt the halogenized product formed. Heat together in an enameled autoclave two and a half (2½) parts of the halogenized product thus obtained, five (5) parts of crystallized sodium sulfanilate, (containing water of crystallization,) and ten (10) parts of water to a temperature of one hundred and eighty (180°) degrees centigrade, until no further dyestuff is formed, which is indicated when the color of the melt does not increase in intensity. When this point is reached, dissolve the mass in water and precipitate by the addition of common salt the coloring-matter formed. It can be purified by redissolving in water and again precipitating with common salt.

*Example 2—Condensation of brom-beta-amido-anthraquinone monosulfo-acid with sodium sulfanilate.*—Heat together in an enameled autoclave two and a half (2½) parts of brom-beta-amido-anthraquinone monosulfo-acid, (such as can be prepared in accordance with the Example 2 of the specification of the application for English Letters Patent No. 5,459 of 1900 with the aid of two molecular proportions of bromin,) five (5) parts of sodium sulfanilate, (containing water of crystallization,) and ten (10) parts of water at a temperature of two hundred (200°) degrees centigrade until the color of the melt no longer increases in intensity. When this stage is reached, work up the reaction product as set forth in the foregoing Example 1.

*Example 3—Condensation of brom-amido-anthraquinone sulfo-acid and metanilic acid, with the aid of calcium acetate.*—Heat together in an enameled autoclave two and a half (2½) parts of the crude mixture of brom-alpha and brom-beta amido-anthraquinone monosulfo-acids, (such as mentioned in Example 7 of the specification of the application for English Letters Patent No. 5,459 of 1900,) five (5) parts of a paste of metanilic acid (containing eighty-five per cent. of real acid) and ten (10) parts of a twenty-per-cent solution of calcium acetate at a temperature of two hundred (200°) degrees centigrade for eight (8) hours, or until the blue color of the melt no longer increases in intensity. Treat the melt when cold with one hundred (100) parts of alcohol and two and a half (2½) parts of concentrated hydrochloric acid. Collect by filtering the coloring-matter which separates out.

*Example 4—Condensation of crude tetra-brom-diamido-anthraquinone with sulfanilic acid.*—Heat together ten (10) parts of crude tetra-brom-diamido-anthraquinone, seventy (70) parts of sodium sulfanilate, three (3) parts of crystallized sodium acetate, and ninety (90) parts of water under pressure at a temperature of two hundred (200°) to two hundred and twenty (220°) degrees centigrade until a test portion is completely soluble in water. Salt out the coloring-matter formed with common salt, press, and dry.

*Example 5—Condensation of tetra-brom-di-toluido-anthraquinone with sulfanilic acid.*—Heat together five (5) parts of crude tetra-brom-di-toluido-anthraquinone, eight (8) parts of sodium sulfanilate, and twenty (20) parts of water in an autoclave at a temperature of about two hundred and thirty (230°) degrees centigrade until the mass has become bright green. The coloring-matter so obtained is insoluble, but by treating it with fuming sulfuric acid and boric acid in the known manner it can be converted into a sulfonated coloring-matter soluble in water which dyes unmordanted wool green-blue and chrome-mordanted wool blue-green.

In the following table I give some of the properties of some of the new coloring-matters obtainable according to this invention:

| Condensation product from— | Solution in water. | Behavior of aqueous solution toward caustic soda and sodium carbonate. | Behavior toward warm alcohol and color of the solution. | Solution in concentrated sulfuric acid (95 per cent. of $H_2SO_4$.) | Solution in cold concentrated sulfuric acid to which boric acid has been added. | Dyes wool mordanted with chrome. |
|---|---|---|---|---|---|---|
| Sulfanilic acid + (alpha and beta) amido-anthraquinone monosulfo-acid bromid (brominated with three molecular proportions of bromin.) Crude coloring-matter. | Dirty blue-green. | Color hardly altered. Excess causes a precipitate. | Fairly-soluble dull violet-blue. | Violet-blue | Somewhat bluer than the solution in sulfuric acid alone. | Gray-green. |
| Sulfanilic acid + (alpha and beta) amido-anthraquinone monosulfo-acid bromid (brominated with three molecular proportions of bromin.) Purified coloring-matter. | Bright blue-green. | Becomes greener. Excess causes a precipitate. | Fairly-soluble green-blue. | Violet-blue | Blue | Bluish green. |
| Sulfanilic acid + (alpha and beta) anilido-anthraquinone monosulfo-acid bromid (brominated with four molecular proportions of bromin.) | Dull blue-green. | Dullens the color of the aqueous solution. | Fairly-soluble blue. | Blue | Blue | Gray-green. |
| Sulfanilic acid + beta-amido-anthraquinone monosulfo-acid bromid (brominated with two molecular proportions of bromin.) | Violet | Color hardly changed. Excess produces a precipitate. | Red-violet | Dull red-violet | Dull blue-violet. | Gray-blue. |
| Sulfanilic acid + alpha-amido-anthraquinone monosulfo-acid bromid (brominated with three molecular proportions of bromin.) | Blue | do | Violet | Dull cherry-red. | Violet | Gray-violet. |
| Sulfanilic acid + (alpha and beta) amido-anthraquinone monosulfo-acid bromid (brominated with four molecular proportions of bromin.) | Violet-blue | Dullens the color of the aqueous solution. | Violet | Cherry-red | Violet | Gray-blue. |
| Metanilic acid + (alpha and beta) amido-anthraquinone monosulfo-acid bromid (brominated with four molecular proportions of bromin.) | Violet | Becomes greener with caustic soda, but little altered with sodium carbonate. | Hardly soluble. | Violet-red | Blue-violet | Gray-blue to blue-black. |
| Sulfanilic acid + crude tetra-brom-diamido-anthraquinone. | Brown-violet | Unchanged | Insoluble | Brown | Hardly altered. | Brown-red |
| Sulfo-acid of the condensation product from sulfanilic acid + crude tetra-brom-1.5-di-para-toluido-anthraquinone. | Blue-green | Becomes greener with caustic soda. Unchanged with sodium carbonate. | Difficultly soluble with blue color. | Blue-green | Yellow-green. | Bluish green. |

Now what I claim is—

1. The process of manufacturing coloring-matters by condensing halogenized amido-anthraquinone substances with the sulfo-acids of primary aromatic amins.

2. The process of manufacturing coloring-matters by condensing halogenized amido-anthraquinone substances with the sulfo-acids of primary aromatic amins and sulfonating the products thus obtained.

3. The new coloring-matters such as can be obtained by condensing halogenized amido-anthraquinone substances with the sulfo-acids of primary aromatic amins, and sulfonating if increased solubility in water is desired, and which are characterized by the following properties: soluble in water giving a blue-green to violet solution; soluble in concentrated sulfuric acid in the presence of boric acid giving greenish to bluish or violet solutions; soluble in concentrated sulfuric acid alone giving reddish to bluish or violet colored solutions.

In testimony whereof I have hereunto set my hand in the presence of two subscribing witnesses.

OSCAR BALLY.

Witnesses:
JOHN L. HEINKE,
JACOB ADRIAN.